United States Patent
Chisholm et al.

[15] 3,698,740
[45] Oct. 17, 1972

[54] DETACHABLE GOOSE-NECK TOWING DEVICE

[72] Inventors: Eugene H. Chisholm, 10143 Avenda Maravilla, Cherry Valley, Calif. 92223; Robert L. Stuart, 510 S. Monroe Street, Banning, Calif. 92220

[22] Filed: Dec. 3, 1970

[21] Appl. No.: 94,675

[52] U.S. Cl. .........280/491 D, 280/423 B, 280/491 E
[51] Int. Cl. ..............................................B60d 1/14
[58] Field of Search ..........280/415 R, 415 A, 415 B, 280/491 R, 491 A, 491 B, 491 C, 491 D, 491 E, 423 B, 425 A

[56] References Cited

UNITED STATES PATENTS

| | | | |
|---|---|---|---|
| 2,599,282 | 6/1952 | Porte | 280/491 D |
| 2,393,016 | 1/1946 | Black | 280/491 B |
| 2,844,265 | 7/1958 | Clark | 280/425 A |

*Primary Examiner*—Benjamin Hersh
*Assistant Examiner*—Robert R. Song
*Attorney*—Herbert E. Kidder and Peter H. Firsht

[57] ABSTRACT

Provision is made for towing a trailer by a conventional hitch connectable to the rear bumper of a car, or by a goose-neck towing tongue having a front portion connectable to a towing vehicle between the front and rear wheels thereof. The rear portion of the tongue has depending terminal projections that are insertable in pockets in a structure on the trailer, while the tongue is disconnected and inclined rearwardly, and locked therein by swinging the tongue upwardly. Each pocket has a semi-cylindrical concavity and a sloping surface in facing relation thereto, and each projection has a mating convexity and a surface engaged by the sloping surface for locking the mating parts together. A rigid, stabilizing bar interconnects the tongue and trailer for transmitting a towing force and maintaining the tongue locked to the trailer.

7 Claims, 5 Drawing Figures

3,698,740

PATENTED OCT 17 1972

INVENTORS.
EUGENE H. CHISHOLM
ROBERT L. STUART

BY Peter H. Firsht
ATTORNEY

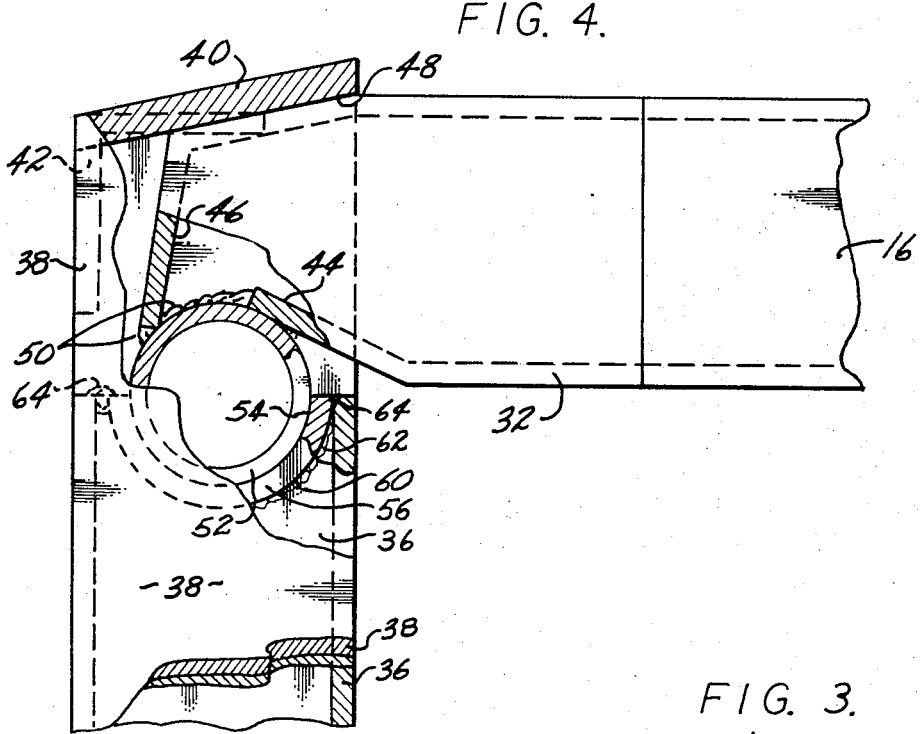
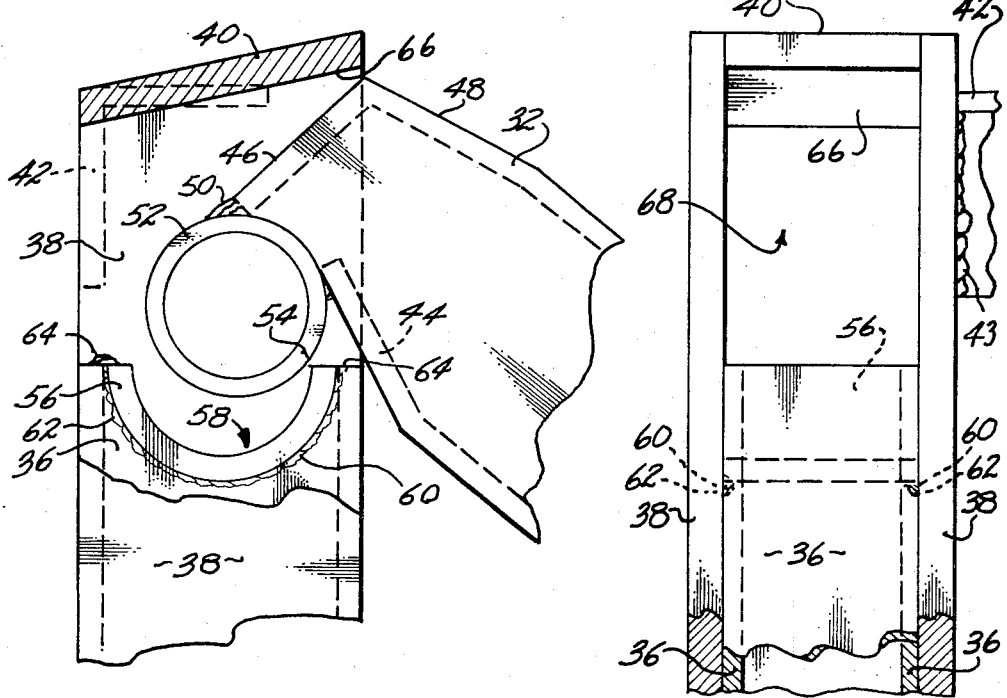

DETACHABLE GOOSE-NECK TOWING DEVICE

BACKGROUND OF THE INVENTION

The present invention relates to trailer hitches, and more particularly to a towing tongue of the goose-neck type which is readily attachable to and detachable from a trailer.

Many types of hitches have been proposed for towing trailers. For example, such hitches vary from a simple link between the trailer and a connector on the rear bumper of a car, to the so-called goose-neck tongue, the front end of which is pivotally connectable to the bed of a motor vehicle between the front and rear wheels thereof. The goose-neck type hitch is preferred since it makes for better trailing of the trailer, and minimizes "fish-tailing" and "jack-knifing."

However, connection of the goose-neck tongue to the bed of the towing vehicle is more involved and time consuming than the simple link hitch. Also, the goose-neck hitch is more costly in construction. Furthermore, goose-neck tongues have heretofore been fixed to the trailer, thus limiting towing thereof to the vehicle especially suited for the purpose. As a result, conventional rear bumper hitches have been employed more widely than the goose-neck type hitches, even in spite of the advantages the latter present over the former.

SUMMARY OF THE INVENTION

It is therefore an object of the present invention to provide a trailer with a novel, detachable goose-neck hitch, as well as a conventional hitch, which hitches are selectively usable as desired.

Another object is to provide a detachable goose-neck tongue which is readily attachable to a trailer and has all the attributes and advantages of a fixed type of goose-neck tongue.

A further object is to provide a goose-neck tongue which is detachably locked to the trailer, in substantially rigid relation thereto.

Still another object of the invention is to provide a detachable goose-neck towing device that is locked to a trailer in a manner which transmits towing force and maintains the device locked to the trailer.

A still further object of the invention is to provide a detachable towing device which is sturdy in construction and reliable in operation.

These and other objects and advantages are achieved by a detachable goose-neck type towing tongue especially designed for trailers that haul valuable horses and other livestock, but not necessarily limited to such use. The towing tongue of the present invention is composed of a pair of rearwardly diverging members, the rear ends of which are interconnected rigidly by a transverse bar. Depending from the forward ends of the members is a front connection portion which terminates in a ball connector receivable in a socket on a towing vehicle. Extending from the rear ends of the members are parallel portions having projections which are receivable in a pair of pockets in a structure on the trailer frame. Each pocket has a mouth opening forwardly, the roof of the mouth being defined by a forwardly inclined surface which is disposed in facing relation to a semi-cylindrical concavity at the bottom of the pocket. Each projection terminates in a convexity adapted to mate with the concavity in the pocket, mating thereof being accomplished by insertion of the projection into the mouth of the pocket with the members inclined rearwardly, and thereafter swinging the members into substantially horizontal position. In such horizontal position, sloping surfaces on the projections are engaged by the inclined surfaces at the tops of the mouths of the pockets, thereby holding the mating parts together. A rigid stabilizing bar has one end pivoted to the trailer and the other end attached to the transverse bar by means of a ball-and-socket connection. The stabilizing bar maintains the towing tongue locked to the trailer and also transmits towing force therebetween.

DESCRIPTION OF THE DRAWINGS

FIG. 3 is a fragmentary front elevational view of a portion of a structure on the trailer, showing the mouth thereof, in which one of the mating parts is received;

FIG. 4 is an enlarged, fragmentary side elevational view of a portion of the towing device, with parts broken away and partly in section, illustrating the locked condition of mating parts; and FIG. 5 is a view somewhat similar to FIG. 4, showing the mating parts separated and representing an intermediate position between the locked condition and complete separation of the towing tongue from the trailer.

DESCRIPTION OF THE PREFERRED EMBODIMENT

Figure 1:
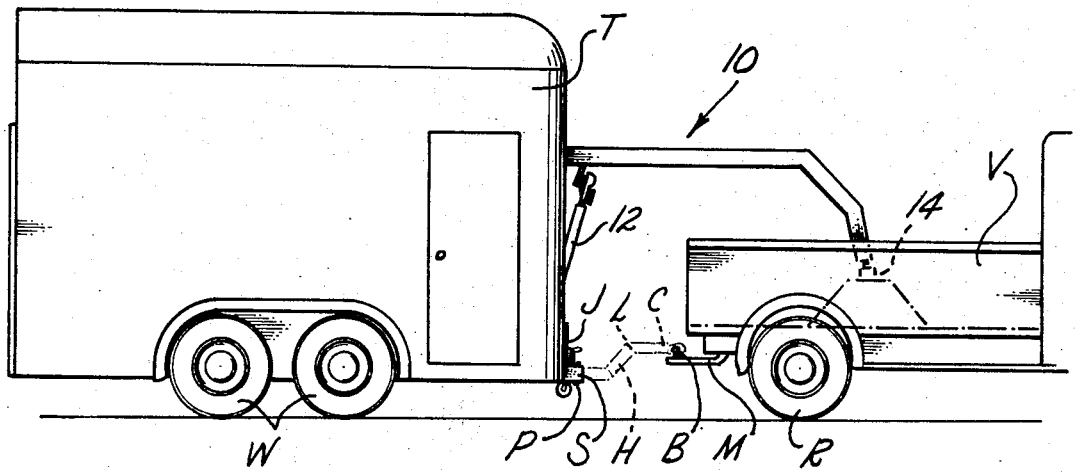
FIG. 1 is a side elevational view of a detachable towing device embodying the principles of the invention, the device being shown in relation to a trailer and a towing vehicle, the figure also showing, in phantom lines, a conventional hitch for alternate towing.

Referring to the drawings, there is shown in FIG. 1 a towing device 10 embodying the principles of the present invention and illustrated in its relation to a trailer T and towing vehicle V. As later made more clear, the towing device is detachably connected to the trailer and the towing vehicle, so that the trailer can be towed thereby, or by a conventional hitch H, shown in phantom lines and commonly referred to as a bulldog hitch. Thus, the trailer can be towed as desired by the bulldog hitch for short hauls at relatively low speeds, or by the towing device of the present invention for long hauls at relatively high speeds. The towing device of the present invention is especially designed for trailers adapted to haul valuable horses and other livestock but, of course, is not limited to use with such trailers.

Figure 2:
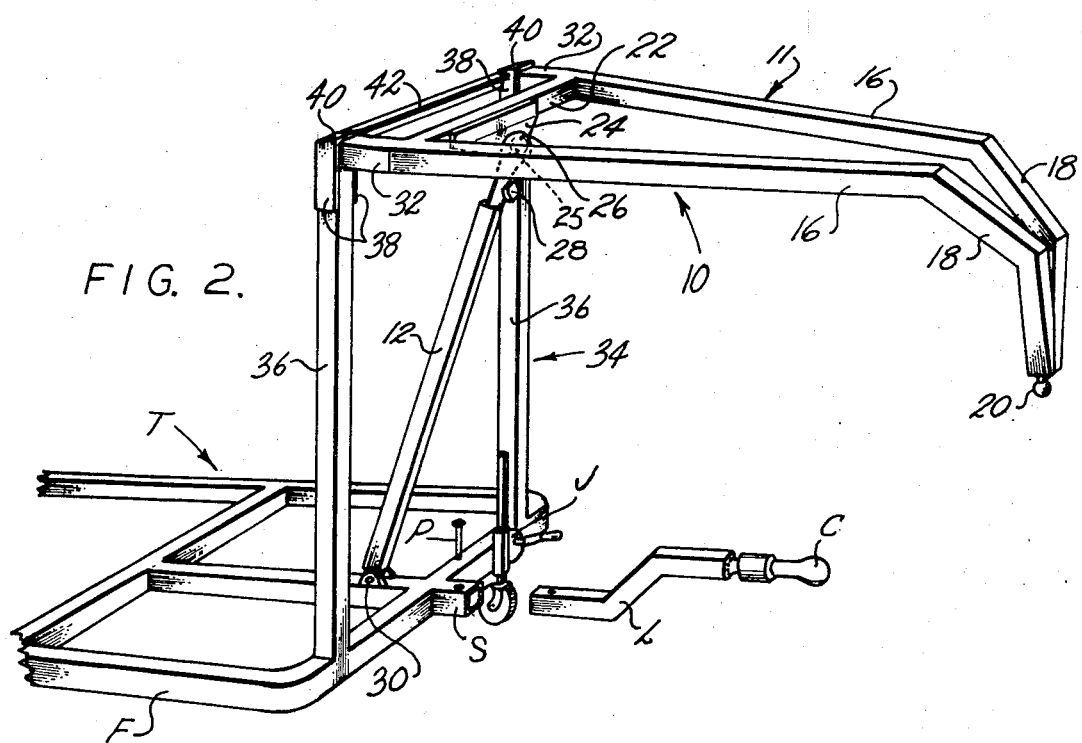
FIG. 2 is an enlarged perspective view of the towing device of the present invention, illustrating its relation to the trailer frame, fragmentarily shown, a conventional hitch also being shown.

More specifically, as shown in FIG. 2, the conventional hitch H includes a towing link L, the rear end of which is adapted to be received in a coupling sleeve S, which is part of a frame F of the trailer T, the frame being fragmentarily shown and the link being coupled thereto by a pin P. The front end of the link is provided with a socket connector C adapted to engage over and be pivotally connected to a ball B on a mount M which is fixed to the rear of the vehicle V. If desired, the ball can be mounted on the rear bumper of a car. The trailer has two pairs of wheels W, which support the major portion of the weight of the trailer and its contents, and a vertically adjustable wheeled jack J, used to support the trailer in a stable condition when it is disconnected from the towing vehicle and standing alone.

The towing device 10 includes an elongated body or towing tongue 11, detachably locked to the trailer frame F, and interconnected therewith by a stabilizing bar 12. The front end of the towing tongue is pivotally connected to a conventional towing connector 14 mounted on the bed of the vehicle V so as to dispose the point of pivotal connection forwardly of the rear wheels R of the vehicle, as shown in FIG. 1.

Returning to FIG. 2, the towing tongue 11 includes a pair of rearwardly diverging tubular members 16, which are substantially horizontally disposed in the operational position thereof. Fixed to the forward ends of the members 16, and depending therefrom, are angularly related tubular members 18, which terminate in a ball 20. The towing connector mount 14 on the vehicle V is provided with a suitable socket or recess and retaining means for receiving and holding the ball 20. Affixed to the rear ends of the tubular members 16 is a rigid tubular member 22, and secured to the intermediate portion of this member is a plate 24. The plate carries a ball 25 adapted to be received and engaged by a socket connector 26 on one end of the stabilizing bar 12. The socket connector is provided with a conventional bifurcated retainer controlled by a hand nut 28, whereby the stabilizing bar can be readily attached and detached. The other end of the stabilizing bar is mounted on the sleeve S for pivotal movement and is connected thereto by a pivot pin 30. When the connector is disconnected, the stabilizing bar is swung back, and is maintained at the out-of-the-way position by any suitable means, not shown.

Extending from the rear ends of the horizontal members 16 are parallel portions 32, which are detachably locked to an upstanding structure 34. The structure includes a pair of tubular uprights or standards 36 fixed at their lower ends to the trailer frame F. Each of the standards has affixed to the upper end thereof a pair of side plates 38, the upper ends of which are interconnected by a top plate or roof 40, better seen in FIG. 3. The innermost side plates are interconnected by a transverse angle iron member 42 secured thereto in any suitable manner, as by welding 43. The stabilizing bar 12 is inclined forwardly transversely of the upstanding structure 34 and serves to transmit towing force between the towing tongue 11 and the frame F of the trailer, and also to maintain the portions 32 in a locked condition to the standards. The several parts are dimensioned so that when the bar 12 is swung back, the connector 26 thereon passes under member 42 with sufficient clearance.

Inviting attention to FIG. 4, it will be noted that each portion 32 is provided with a pair of straps 44 and 46 and has a sloping upper surface 48. Secured to the straps, as by welding 50, is a short piece of cylindrical pipe 52 disposed transversely. The lower portion of the pipe defines a depending projection or convexity 54, adapted to fit into and mate with a semi-cylindrical piece of pipe 56 having a semi-cylindrical recess or concavity 58 with an inside diameter equal to the outside diameter of the pipe 54, better seen in FIG. 5. Pipe 56 fits into a pair of semi-circular notches 60 formed in the upper end of each standard 36, with the semi-cylindrical recess or concavity 58 of the pipe opening upwardly, the pipe being secured in place by welding 62 and 64.

The top plate or roof 40 is slightly inclined forwardly and has an undersurface 66 which faces the semi-cylindrical recess or concavity 58 of pipe 56, and is adapted to engage the surface 48 on portion 32 for holding the lower portion 54 of the pipe 52 locked in the concavity, as shown in FIG. 4. Together, the top plate, concavity, and associated side plates 38 define a pocket having a mouth 68, best seen in FIG. 3.

To lock the pipes 52 to the pipes 56, the towing tongue 11 is tilted downwardly, and the pipes 52 on the portions 32 are inserted in the mouths 68 of the pockets in the structure 34. The towing tongue is then swung upwardly, and the portions 32 are manipulated to seat the convex lower portion 54 of each pipe 52 in the concavity 58 of its associated pipe 56, with the surface 48 on the respective parallel portion in engagement with the undersurface 66 of the associated plate 40, as shown in FIG. 4. The stabilizing bar 12 is then connected to plate 24, and hand nut 28 is manipulated to secure such connection. This disposes the members 16 substantially horizontally, and the towing tongue is now locked to the trailer frame F. To unlock the tongue, the procedure is reversed.

After the towing tongue 11 has been locked to the trailer frame F and ball 20 has been coupled to the connector 14, the trailer T can be towed goose-neck fashion. It is to be noted that any vertical movement of the tongue is transmitted to the trailer frame F by the stabilizer bar 12. The same is true of any towing force imparted to the tongue.

It is believed that the operation of the towing device of the present invention is clearly apparent and is briefly summarized at this point. Assuming that the jack J has been adjusted downwardly and the trailer T is standing alone, when it is desired to employ the towing device 10, the towing link L, if coupled to the trailer frame F, is removed, and the towing tongue 11 is brought proximate to the trailer and is tilted so that the members 16 thereof slope downwardly. The projections represented by pipes 52 are inserted into pockets of the structure 34, as shown in FIG. 5. The towing tongue is then manipulated and worked rearwardly, so that it can be swung up to dispose the members 16 in substantially horizontal position, with the convexities 54 of the projections in the semi-cylindrical concavities 58 of the pipes 56 and the surfaces 48 of parallel portions 32 in engagement with the undersurfaces 66 of plates 40, as shown in FIG. 4. The stabilizing bar 12 is then swung forwardly and connector 26 thereof is secured to the plate 24 of the towing tongue to maintain it locked to the structure 34. With the jack J adjusted to dispose the ball 20 of the towing device at a sufficient height, the towing vehicle V is backed up toward the trailer to dispose the towing connector 14 under the ball, after which the jack is adjusted to insert the ball in the connector for securement therein. With movement of the vehicle, towing force is transmitted through the device to the stabilizing bar which transmits such force to the trailer frame F.

There has thus been provided a novel towing device adapted to tow a trailer in goose-neck fashion, which makes for better trailing of the trailer and minimizes fish-tailing and jack-knifing, the towing device being readily detachable and attachable, whereby the trailer can be selectively towed, using the towing device of the present invention or by a conventional hitch rearwardly of the rear wheels of the vehicle, thus making for greater versatility in the manner of towing the trailer.

Although the towing device of the present invention has been herein shown and described in considerable detail in what is believed to be the preferred and practical embodiment thereof, it is to be understood that many variations thereof are possible, and the present invention is not to be limited to such details, but is to be accorded the full scope of the appended claims.

Having described the invention, what is desired to secure by Letters Patent is:

1. A towing device comprising:
   an elongated body having front and rear portions, said front portion being adapted to be connected to a towing vehicle, and means for detachably connecting said rear portion to a trailer frame,
   said means having a pocket including a recess and a surface facing the recess, and the rear portion including a projection receivable in said pocket between the recess and surface, said surface cooperating with said rear portion for holding the projection in the pocket; and
   stabilizing means connectable between the body and the trailer frame serving to maintain the rear portion in cooperative relation with said surface.

2. The towing device of claim 1, wherein said surface faces downwardly and said rear portion has a member from which the projection depends, and said pocket has a mouth which opens forwardly, said projection being receivable in the pocket by insertion into said mouth with the member inclined rearwardly and thereafter swinging the member upwardly against said surface for holding the projection in the pocket.

3. The towing device of claim 1, wherein said body includes a pair of rearwardly diverging members terminating in parallel end portions, each end portion having a projection thereon, and said trailer frame has fixed thereto an upstanding structure having a pair of pockets, in which said projections are receivable, said rearwardly diverging members being interconnected by a transverse member disposed forwardly of said projections, and said stabilizing means includes a rigid bar connected to said transverse member, the lower end of said bar being connected to the trailer frame, said bar being inclined forwardly transversely of said structure, whereby movement imparted to the rearwardly diverging members is transmitted to the trailer frame.

4. A towing device comprising an elongated body having front and rear portions, said front portion being adapted to be connected to a towing vehicle, and means for detachably locking said rear portion to a trailer frame including a projection which depends from said rear portion, and said trailer frame having a structure with a pocket for receiving the projection, said structure having a surface cooperating with said rear portion for holding the projection in the pocket, said pocket having a recess in facing relation to said surface, said projection being insertable between the surface and the recess and having a part fitting into the latter; and stabilizing means connectable between the body and trailer frame, said stabilizing means serving to transmit towing force and to maintain said rear portion in cooperative relation with said surface for holding the body locked to the trailer frame.

5. The towing device of claim 4, wherein said recess is elongated along a direction transverse to the direction of towing, and said surface is inclined and faces the direction of towing.

6. The towing device of claim 5, wherein said recess is a semi-cylindrical concavity, and said part has a mating convexity.

7. A towing device comprising an elongated body having front and rear portions, said front portion being adapted to be connected to a towing vehicle and means for detachably locking said rear portion to a trailer frame, said body including a pair of rearwardly diverging members, said front portion depending from the forward ends of said members and terminating in a pivotal connector, said rear portion including a pair of depending projections on the rear ends of said members, said projections being receivable in a pair of pockets on the trailer frame, each of said pockets having a mouth opening forwardly and a concavity, said projections being inserted into the mouths of the pockets while the members are inclined rearwardly, after which the members are swung into substantially horizontal position for seating the projections in the concavities, the tops of said mouths of the pockets being defined by plates which are inclined forwardly, in facing relation to the concavities, and have undersurfaces engageable with sloping surfaces on the projections for retaining them seated in the concavities when the members are swung upwardly to substantially horizontal position; and stabilizing means connectable between the body and the trailer frame, said stabilizing means serving to transmit towing force and to maintain the body locked to the trailer frame.

* * * * *